United States Patent
Kosseifi et al.

(10) Patent No.: US 11,595,915 B2
(45) Date of Patent: *Feb. 28, 2023

(54) ALTITUDE BASED DEVICE MANAGEMENT IN A WIRELESS COMMUNICATIONS SYSTEM

(71) Applicant: AT&T Intellectual Property I, L.P., Atlanta, GA (US)

(72) Inventors: Mario Kosseifi, Roswell, GA (US); Giuseppe De Rosa, Atlanta, GA (US); Ron Kiefer, Louisville, KY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/187,277

(22) Filed: Feb. 26, 2021

(65) Prior Publication Data

US 2021/0282091 A1 Sep. 9, 2021

Related U.S. Application Data

(63) Continuation of application No. 16/569,146, filed on Sep. 12, 2019, now Pat. No. 10,952,159, which is a
(Continued)

(51) Int. Cl.
*H04W 52/28* (2009.01)
*H04W 36/32* (2009.01)
(Continued)

(52) U.S. Cl.
CPC ......... *H04W 52/283* (2013.01); *B64C 39/024* (2013.01); *H04W 8/24* (2013.01);
(Continued)

(58) Field of Classification Search
CPC ........ B64C 2201/122; B64C 2201/146; B64C 39/024; H04W 36/32; H04W 52/0212;
(Continued)

(56) References Cited

U.S. PATENT DOCUMENTS 6,941,152 B2 9/2005 Proctor, Jr. et al.
7,302,316 B2 11/2007 Beard et al.
(Continued)

FOREIGN PATENT DOCUMENTS

CA 2935457 A1 7/2015
CN 103744430 A 4/2014
(Continued)

OTHER PUBLICATIONS

Non-Final Office Action received for U.S. Appl. No. 15/474,754 dated Jul. 10, 2018, 20 pages.
(Continued)

*Primary Examiner* — Phuc H Tran
(74) *Attorney, Agent, or Firm* — Amin, Turocy & Watson, LLP

(57) ABSTRACT

Altitude based device management is provided herein. A method can comprise transmitting, by a mobile device comprising a processor, a signaling message to a network device of a wireless network. The signaling message can comprise first data indicating a device type of the mobile device and second data indicating a distance measurement of the mobile device with respect to a reference point. The method can also comprise implementing, by the mobile device, a first instruction related to a power setting and a second instruction related to an operating parameter. The first instruction and the second instruction can be received from the network device and can be based on the device type of the mobile device and the distance measurement of the mobile device.

20 Claims, 10 Drawing Sheets

Related U.S. Application Data continuation of application No. 15/474,754, filed on Mar. 30, 2017, now Pat. No. 10,455,520.

(51) Int. Cl.
*B64C 39/02* (2023.01)
*H04W 8/24* (2009.01)
*H04W 52/02* (2009.01)

(52) U.S. Cl.
CPC ....... *H04W 36/32* (2013.01); *H04W 52/0212* (2013.01); *H04W 52/281* (2013.01); *B64C 2201/122* (2013.01); *B64C 2201/146* (2013.01); *Y02D 30/70* (2020.08)

(58) Field of Classification Search
CPC ... H04W 52/281; H04W 52/283; H04W 8/24; Y02D 30/70
See application file for complete search history.

(56) References Cited

U.S. PATENT DOCUMENTS

| | | | |
|---|---|---|---|
| 8,135,417 | B2 | 3/2012 | Shan et al. |
| 8,600,370 | B2 | 12/2013 | Chaoudhury et al. |
| 8,655,864 | B1 | 2/2014 | Strohm et al. |
| 8,937,874 | B2 | 1/2015 | Gainey et al. |
| 9,083,425 | B1 | 7/2015 | Frolov et al. |
| 9,288,231 | B2 | 3/2016 | Reddy et al. |
| 9,344,971 | B2 | 5/2016 | Ohyama |
| 9,406,237 | B2 | 8/2016 | Downey et al. |
| 9,424,729 | B2 | 8/2016 | Warren et al. |
| 9,537,561 | B1 * | 1/2017 | Kotecha ............... H04W 8/00 |
| 9,545,995 | B1 | 1/2017 | Chau et al. |
| 9,576,493 | B2 | 2/2017 | Jarrell |
| 9,588,516 | B1 | 3/2017 | Gurel et al. |
| 9,589,448 | B1 | 3/2017 | Schneider et al. |
| 2007/0123272 | A1 | 5/2007 | Ida et al. |
| 2011/0143805 | A1 | 6/2011 | Ramasamy et al. |
| 2012/0021737 | A1 * | 1/2012 | Luo .................. H04W 52/50 455/422.1 |
| 2012/0252453 | A1 | 10/2012 | Nagaraja et al. |
| 2013/0176874 | A1 | 7/2013 | Xu et al. |
| 2016/0044453 | A1 * | 2/2016 | Chou .................. H04L 45/74 455/456.1 |
| 2016/0068267 | A1 | 3/2016 | Liu et al. |
| 2016/0370800 | A1 | 12/2016 | Chau et al. |
| 2016/0371985 | A1 | 12/2016 | Kotecha |
| 2017/0012697 | A1 | 1/2017 | Gong et al. |
| 2017/0013476 | A1 | 1/2017 | Suthar et al. |
| 2017/0024929 | A1 | 1/2017 | Priest |
| 2017/0029107 | A1 | 2/2017 | Emami et al. |
| 2017/0032647 | A1 | 2/2017 | Warren et al. |
| 2017/0069214 | A1 | 3/2017 | Dupray et al. |
| 2017/0076616 | A1 | 3/2017 | Kanade et al. |
| 2017/0086048 | A1 | 3/2017 | Cho |
| 2017/0303153 | A1 | 10/2017 | Siomina et al. |

FOREIGN PATENT DOCUMENTS

| | | |
|---|---|---|
| GB | 2532966 A | 6/2016 |
| WO | 9707609 A2 | 2/1997 |
| WO | 2016210432 A1 | 12/2016 |
| WO | 2017030243 A1 | 2/2017 |
| WO | 2017040974 A1 | 3/2017 |

OTHER PUBLICATIONS

Non-Final Office Action received for U.S. Appl. No. 15/474,754 dated Dec. 26, 2018, 15 pages.
Isaacs et aL, "Quadrotor Control for RF Source Localization and Tracking," 2014 International Conference on Unmanned Aircraft Systems (ICUAS), May 2014, pp. 244-252, IEEE, 9 pages.
Ermacora et aL, "A Cloud Based Service for Management and Planning of Autonomous UAV Missions in Smart City Scenarios," International Workshop on Modelling and Simulation for Autonomous Systems, 2014, Springer Intenational Publishing, 7 pages. http://porto.polito.it/2585354/2/2585354.pdf. Retrieved on Apr. 12, 2017.
Reed et aL, "SkyNET: A 3G-Enabled Mobile Attack Drone and Stealth Botmaster," WOOT, 2011, 9 pages, http://static.usenix.org/events/woot11/tech/final_files/Reed.pdf? Retrieved on Apr. 12, 2017.
Purohit et al., "SensorFiy: Controlled-mobile Sensing Platform for Indoor Emergency Response Applications," 10th Intenational Conference on Information Processing in Sensor Networks (IPSN), 2011, IEEE, 12 pages, http://repository .cmu.edu/cgi/viewcontent. cgi?article= 1 060&context=silicon_valley. Retrieved on Apr. 12, 2017.
Guo et al, "Performance Analysis of Micro Unmanned Airborne Communication Relays for Cellular Networks," 9th Intenational Symposium on Communication Systems, Networks & Digital Sign (CSNDSP), 2014, pp. 658-663, IEEE, https:/Jarxiv.org/pdf/1407.0640. Retrieved on Apr. 12, 2017.
Non-Final Office Action received for U.S. Appl. No. 16/569,146 dated Jun. 1, 2020, 26 pages.
Non-Final Office Action received for U.S. Appl. No. 16/569,146 dated Jun. 30, 2020, 13 pages.
U.S. Appl. No. 16/569,146, filed Sep. 12, 2019.
U.S. Appl. No. 15/474,754, filed Mar. 30, 2017.

* cited by examiner

ALTITUDE BASED DEVICE MANAGEMENT IN A WIRELESS COMMUNICATIONS SYSTEM

RELATED APPLICATION

This application is a continuation of, and claims priority of to each of, U.S. patent application Ser. No. 16/569,146 (now U.S. Pat. No. 10,952,159), filed Sep. 12, 2019, and entitled "ALTITUDE BASED DEVICE MANAGEMENT IN A WIRELESS COMMUNICATIONS SYSTEM," which is a continuation of U.S. patent application Ser. No. 15/474,754 (now U.S. Pat. No. 10,455,520), filed Mar. 30, 2017, and entitled "ALTITUDE BASED DEVICE MANAGEMENT IN A WIRELESS COMMUNICATIONS SYSTEM," the entireties of which applications are expressly incorporated herein by reference.

TECHNICAL FIELD

The subject disclosure relates generally to communications systems, and for example, to facilitate altitude based device management in a wireless communications system.

BACKGROUND

Unmanned aerial vehicles (UAVs) or drones are aircrafts without a human pilot on board the vehicle. A wireless communications network can be employed to provide communication between the drone and a ground-based controller. This use of the wireless communications network can cause uplink interference within the wireless communications network. Further, the uplink interface can be difficult to control since the drone can be operating inline with, or above, network devices of the wireless communications network.

BRIEF DESCRIPTION OF THE DRAWINGS

Various non-limiting embodiments are further described with reference to the accompanying drawings in which.

DETAILED DESCRIPTION

Figure 1:
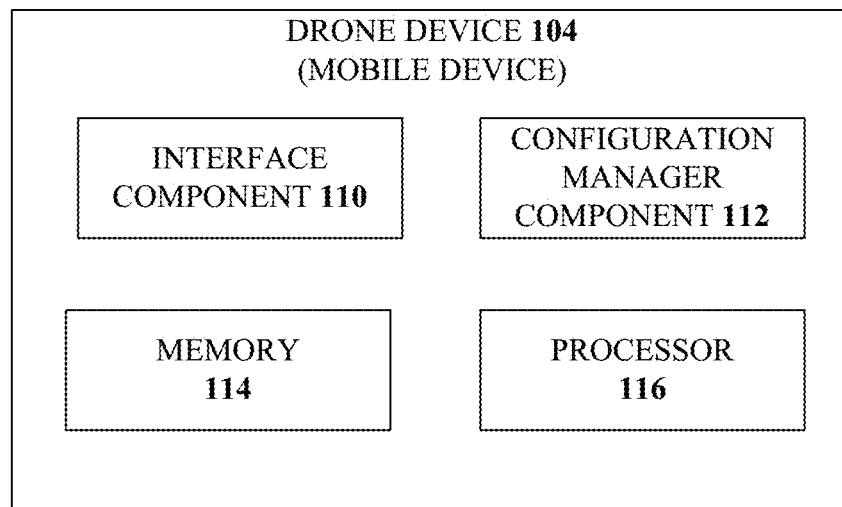
FIG. 1 illustrates an example, non-limiting communications system for providing altitude based device management in a wireless communications system in accordance with one or more embodiments described herein.
Figure 1:
Figure 1:
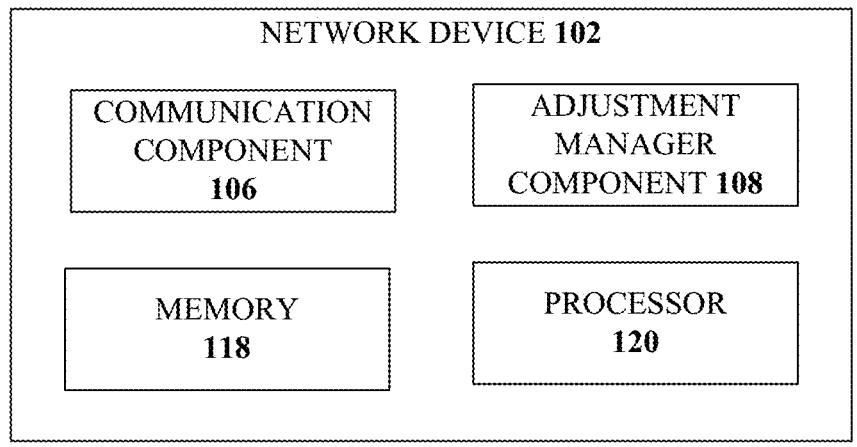

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that provide altitude based device management in a wireless communications system. Mobile devices that are capable of operating at a high altitude (e.g., devices capable of flight) can have a different network complexion than terrestrial devices (e.g., devices not capable of flight) because the high altitude devices are inline or above the cell sites (e.g., network device, base station). Thus, the high altitude device is almost operating in free space and can be in the line of sight of a multitude of cell sites since there are no ground based obstructions (e.g., clutter, terrain). In contrast, a terrestrial or ground based device might be in the line of sight of one, two, or three cell sites at a time. Thus, high altitude devices can have different issues than ground-based devices. These issues include, but are not limited to: hand-off issues, power control issues, interference, higher Physical Resource Block (PRB) utilizations, and so on.

According to an implementation, the drone device might be instructed to identify itself to the network and to periodically report its altitude via signaling messages, for example. This can allow the network to quickly identify the drone device and to manage the drone device(s) differently from other devices (e.g., traditional mobile devices or handsets). As discussed herein, a drone profile can be utilized and the network can communicate with the drone devices in order to provide instructions related to power settings and other operating parameters (e.g., handover parameter and other parameters). Thus, the drone radio can work with the network to address issues that might be created with the use of traditional cellular radios in drone devices.

In one embodiment, described herein is a method that can comprise transmitting, by a mobile device comprising a processor, a signaling message to a network device of a wireless network. The signaling message can comprise first data indicating a device type of the mobile device and second data indicating a distance measurement of the mobile device with respect to a reference point. The method can also comprise implementing, by the mobile device, a first instruction related to a power setting and a second instruction related to an operating parameter. The first instruction and the second instruction can be received from the network device and can be based on the device type of the mobile device and the distance measurement of the mobile device.

According to another embodiment, a system can comprise a processor and a memory that stores executable instructions that, when executed by the processor, facilitate performance of operations. The operations can comprise transmitting a first signal that comprises a first indication of a device type and a second signal that comprises a second indication of a distance measurement of a device with respect to a reference datum. The operations can also comprise adjusting a first configurable setting of the device and a second configurable setting of the device based on an instruction received in reply to the transmitting the first signal and the second signal.

According to an implementation, transmitting the first signal can comprise setting a first indicator in a message to a defined binary value based on the device being a self-powered device capable of being airborne. Further to this implementation, the distance measurement can be a vertical distance measurement, and transmitting the second signal can comprise changing a second indicator in the message based on the vertical distance measurement being within a defined measurement range.

According to yet another embodiment, described herein is a machine-readable storage medium comprising executable instructions that, when executed by a processor, facilitate performance of operations. The operations can comprise sending, to a network device of network devices, a signaling message that comprises first data indicative of a device type of a mobile device and second data indicative of a distance measurement of the mobile device with respect to a reference point. Further, the operations can comprise modifying a power setting based on a first instruction and an operating parameter based on a second instruction. The first instruction and the second instruction can be received in response to the signaling message and are customized for the mobile device.

Referring initially to FIG. 1 illustrated is an example, non-limiting communications system 100 for providing altitude based device management in a wireless communications system in accordance with one or more embodiments described herein.

Wireless networks (e.g. cellular networks) were originally designed to provide coverage to mobile devices located on (or near) the ground. With the increased usage of aerial vehicles, the communications networks would benefit from adaptation to provide coverage to devices that are located away from the ground. For example, aerial vehicles can have an altitude factor of up to 400 feet or more. Further, the aerial vehicles can have multiple flying scenarios (e.g., flying with speed, hovering, and so on). Thus, wireless communications networks should adapt in order to service devices located at higher altitudes (e.g., higher than an antenna of the network). At higher altitudes, the cell is likely to have more neighbor cells than at a lower altitude. Further, uplink power control allows the drones to transmit at relatively high power when the serving cell path loss is small.

The non-limiting communications system 100 can comprise a network device 102 and a mobile device, referred to as a drone device 104. The network device 102 can be included in a group of network devices of a wireless network. Although only a single mobile device and a single network device are illustrated, the non-limiting communications system 100 can comprise a multitude of drone devices and/or a multitude of network devices. According to some implementations, the drone device 104 can be a high altitude device, commonly referred to as a drone within this detailed description. Further, in some implementations, the wireless communications system can include non-drone devices (e.g., terrestrial devices).

The network device 102 can comprise a communication component 106 and an adjustment manager component 108. The drone device 104 can include an interface component 110 and a configuration manager component 112. The communication component 106 can receive one or more messages from the drone device 104, which can communicate through the interface component 110. The one or more messages can be signaling messages or other messages that can facilitate communications in a wireless communications network.

As discussed herein, the drone device 104 can be a high altitude device that might operate in an airspace that is at the same level as the network device 102, or that is above the network device 102. Since the drone device 104 is capable of flight, the drone device 104 can fly up in the air and, when the drone device 104 is equipped with wireless communications capabilities, the drone device 104 can be operating in free space. Thus, the drone device 104 can emit a large amount of uplink interface (e.g., reverse interference or interference from the drone device 104 and back to the network device 102). The antennas of the network device 102 can be pointed toward the ground (e.g., antenna downtilts optimized for terrestrial traffic) and, therefore, different considerations (e.g., drone antenna pattern is omni-directional) are necessary for the drone device 104. For example, when in the air, the drone device 104 does not have the same concerns with respect to a power level, a signal strength, and so on, that terrestrial devices might be experiencing.

Figure 2:
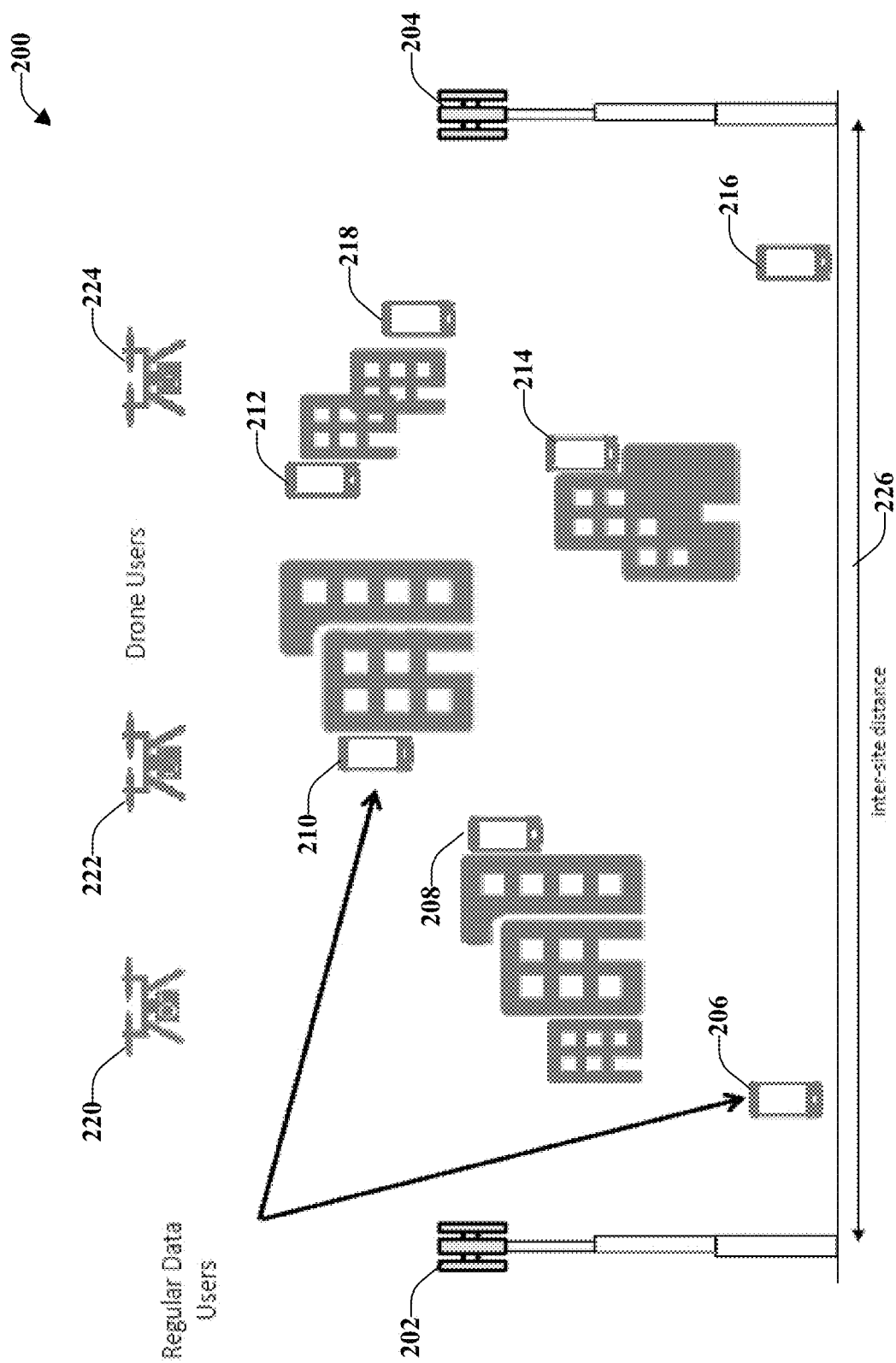
FIG. 2 illustrates an example, non-limiting communications environment in accordance with one or more embodiments described herein.

To further explain the various aspects, FIG. 2 illustrates an example, non-limiting communications environment 200 in accordance with one or more embodiments described herein. The non-limiting communications environment 200 can include one or more network devices, illustrated as a first network device 202 and a second network device 204. According to an implementation, the network devices can be referred to as base stations, eNodeBs, and so on. Also included in the non-limiting communications environment 200 can be one or more terrestrial mobile devices 206, 208, 210, 212, 214, 216, and 218. Further, there can be one or more UAV devices or drone devices 220, 222, and 224 within the non-limiting communications environment 200. An inter-site distance 226 (e.g., line of sight) for the terrestrial mobile devices 206, 208, 210, 212, 214, 216, and 218 can be between the first network device 202 and the second network device 204, as illustrated. However, for the drone devices 220, 222, and 224, the line of sight goes beyond the first network device 202 and the second network device 204. This expanded line of sight is due to the drone devices 220, 222, and 224 operating above the first network device 202 and the second network device 204.

Further, since the drone devices 220, 222, and 224 are mixed with the terrestrial mobile devices 206, 208, 210, 212, 214, 216, and 218, the first network device 202 and the second network device 204 might not be aware which devices are drone devices and which devices are terrestrial mobile devices.

In an example, as drone height increases, the geographic distribution of drones served by a site may become wider and wider due to much larger visibility of farther sites, and due to nulls in the vertical antenna pattern of closer-in servers. Increasing drone height can cause dramatic increases in average uplink IoT. This problem can increase as the video rate for drones increases. Further, as drone height increases, servers might become significantly stronger due to clear line of sight and uncluttered environment. Drones transmitting from large heights can cause significant interference to multiple surrounding sectors. In addition, increasing drone height might necessitate increasingly greater PRB resources to support a same amount of traffic. Additionally, increasing drone height can cause significant impact to throughput of regular LTE users (or other users) due to increasing IoT and average PRB utilization levels. Similar trends can be observed for cell-edge and cell-center LTE users, and also for UHF band.

With reference again to FIG. 1, the network device 102, upon receiving messages from the drone device 104 might not be aware that the drone device 104 is operating at, or above, the network device 102 (e.g., in the air). Therefore, the configuration manager component 112 can inform the network device 102, through the interface component 110, that the drone device 104 is a drone. The information related to whether the device is a drone device (e.g., is capable of flying) can be programmed in a chipset associated with the drone device 104, according to an implementation.

Further, the drone device 104 can provide a distance measurement in the one or more messages. The distance measurement can indicate the altitude of the drone device 104. According to some implementations, the distance measurement can include the geographic coordinates and the altitude of the drone device 104.

Based on the device type and the distance measurement, the network device 102, using the adjustment manager component 108, can customize one or more parameters for the drone device. For example, a parameter can be a power parameter, an operational parameter, a hand-off parameter, and so on. The customization of the one or more parameters can be provided as instructions to the drone device 104 and, based on these instructions, the drone device 104 can implement the updated parameters (e.g., reduce or mitigate a power level, hand-off to an identified network device, and so on).

It is noted that a hand-off (or handover) might not change much with altitude changes for some devices. However, for other devices, the handover rate might be higher at 400 feet as compared to 250 feet, for example. There may also be a larger number of neighbors at one height versus another height. The increase in the handover rate might be due to a tilted antenna. The handover points can be correlated to slight variation on an uplink throughput.

The communication component 106 can be a transmitter/receiver configured to transmit to and/or receive data from the network device 102 to other network devices, the drone device 104, and/or other drone devices or mobile devices. Through the communication component 106, the network device 102 can concurrently transmit and receive data, the network device 102 can transmit and receive data at different times, or combinations thereof.

The network device 102 can also comprise a memory 114 operatively coupled to a processor 116. The memory 114 can store protocols associated with altitude based device management as discussed herein. Further, the memory 114 can facilitate action to control communication between the network device 102 and the drone device 104, such that the non-limiting communications system 100 can employ stored protocols and/or algorithms to achieve improved communications in a wireless network as described herein.

The interface component 110 can be a transmitter/receiver configured to transmit to and/or receive data from the drone device 104, to the network device 102, other network devices, other drone devices and/or mobile devices. Through the interface component 110, the drone device 104 can concurrently transmit and receive data, the drone device 104 can transmit and receive data at different times, or combinations thereof.

Further, the drone device 104 can comprise a memory 118 operatively coupled to a processor 120. The memory 118 can store protocols associated with altitude based device management as discussed herein. Further, the memory 118 can facilitate action to control communication between the drone device 104 and the network device 102, such that the non-limiting communications system 100 can employ stored protocols and/or algorithms to achieve improved communications in a wireless network as described herein.

Various experiments were conducted in accordance with the disclosed aspects. Based on these experiments, it was observed that better drone coverage (DownLink Reference Signal Received Power (DL RSRP)) deteriorated a drone interference (DL Reference Signal Received Quantity (RSRQ)). Further, it was observed that the drone impacted uplink interference on the adjacent cells. In addition, a larger drone traffic can have an impact on performance of the network, including uplink interference and average PRB utilization.

Figure 3:
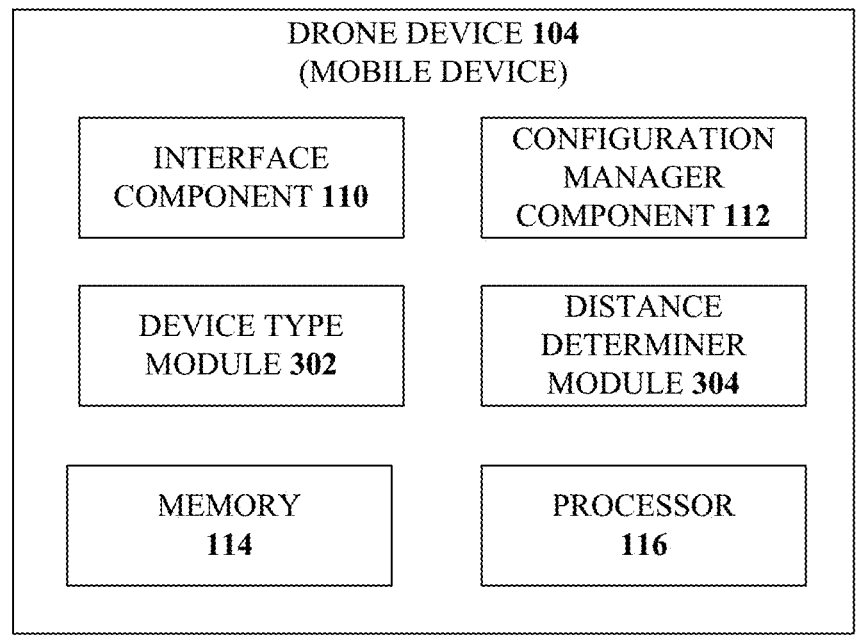
FIG. 3 illustrates an example, non-limiting system for management of devices in a wireless communications network in accordance with one or more embodiments described herein.
Figure 3:
Figure 3:
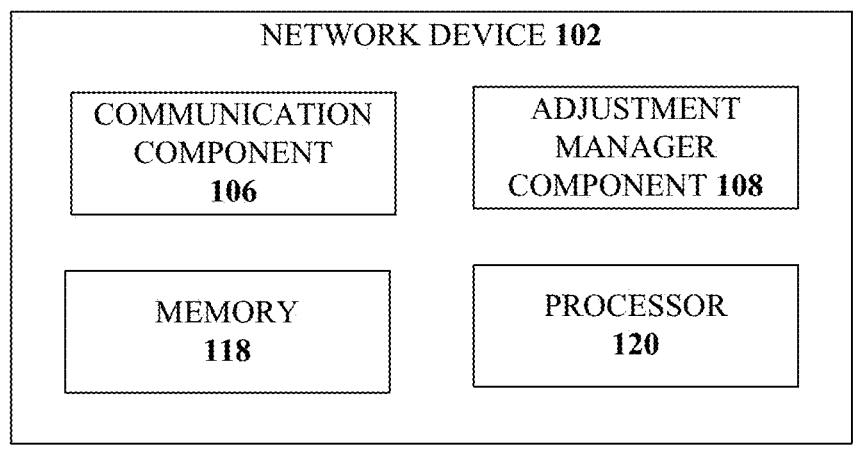

FIG. 3 illustrates an example, non-limiting system 300 for management of devices in a wireless communications network in accordance with one or more embodiments described herein. Repetitive description of like elements employed in other embodiments described herein is omitted for sake of brevity.

The non-limiting system 300 can comprise one or more of the components and/or functionality of the non-limiting communications system 100 and vice versa. As discussed herein, steady sustained drone traffic could have a dramatic impact on performance of the wireless network including significantly larger uplink IoT and average PRB utilization. This can have a negative impact to uplink throughput performance of regular uplink LTE users.

A device type module 302 can retain information related to the drone device 104 including a device type of the drone device 104. For example, the device type can comprise information related to whether the device is capable of movement in a vertical direction as compared to a terrestrial device not capable of movement in the vertical direction. Based on whether the device is capable of vertical movement, the device type module 302 can set a first flag in a signaling message to a binary value that corresponds to the capabilities of the drone device 104. For example, if the device is not capable of vertical movement (e.g., self-powered vertical movement), the first flag can be empty or have a value of zero. However, if the device is capable of the vertical movement, the device type module 302 can set the first flag to one. It should be noted that other manners of identifying whether the device is capable of flight can be utilized with the disclosed aspects.

A distance determiner module 304 can measure a distance of the drone device 104 with respect to a reference point. In an implementation, the reference point can be a local ground level. According to another implementation, the reference point can be a mean sea level. Further, the distance can be an altitude measurement. The distance determiner module 304 can set a second flag in the signaling message to a numerical value based on the distance. According to some implementations, the numerical value is based on a range of distances. In an example, non-limiting implementation, a value of "0" can indicate an altitude between 0 and 50 feet; a value of "1" can indicate an altitude between 50 and 100 feet, a value of "2" can indicate an altitude between 100 and 200 feet; a value of "3" can indicate an altitude between 200 and 300 feet; a value of "4" can indicate an altitude between 300 and 400 feet; and a value of "5" can indicate an altitude above 400 feet. Although certain values and altitudes are provided herein, the disclosed aspects are not limited to this implementation and other values and/or altitude ranges can be utilized.

In accordance with some implementations, rather than using ranges, the altitude value can be provided. However, according to various implementations, using a range of altitudes can conserve battery resources at the drone device 104. For example, providing a more accurate altitude can drain the battery of the drone device 104. Further, the determination of how to represent the altitude can be a function of how many flags (and/or the number of bits being transmitted) in the signaling message are dedicated for the communications discussed herein.

Based on the values of the first flag and second flag (or other flags that can be set in accordance with the various aspects provided herein), the network device 102 can determine one or more parameters for the drone device 104. For example, based on the settings, the network device 102 can determine the device is a drone and can transmit two or more parameters, which can be different parameters than those provided to terrestrial devices. For example, the network device 102 can transmit parameters x and y to the terrestrial devices. However, for the drone device 104, the network device 102 can transmit parameters x' and y'.

Since the signaling message can be communicated in real-time (or fairly often), changes in the altitude can change and the network device 102 (or another network device handed-off to as the drone device 104 moves within the wireless communications network) can provide further instructions related to the x', y', and/or other parameters. Accordingly, the x' and y' parameters (as well as other parameters) can be tailored for the drone device 104.

According to an implementation, mitigation options can be provided. For a theoretical TX (transmit) power equals alpha*PL+P0_pusch+10*log 10(PRB). The alpha or P0_pusch (through P0 UE (user equipment) offset) can be changed to make the drone TX power roll off faster with pathloss, or it can be flattened to maintain low interference at the expense of UL throughput. In an example, the maximum UE TX power can be made lower for drones than for normal (e.g., terrestrial) UEs. The eNB antenna pattern can play a role in determining neighbor cells. Thus, an antenna with a good vertical pattern can help improve the dominance.

In general, when pathloss is small, the drone can cause higher interference to neighbor cells. Interference can be estimated by UE TX power minus pathloss to neighbor cells. For a hovering phase, the drone straightly flies up and down. This pathloss change is mainly due to altitude and terrain profile not due to distance to serving cell. When serving cell pathloss is small, the neighbor cell pathloss can also be small.

In a 'flying around' phase, a similar trend was observed: within certain pathloss range, when pathloss is small, the drone can cause higher interference to neighbor cells. However, at 400 feet after certain point, the interference to neighbor cell increases with pathloss to serving cell increases. When the drone is flying around, it has more chances of LOS. The pathloss to neighbor cell may decrease with serving cell pathloss increases.

Figure 4:
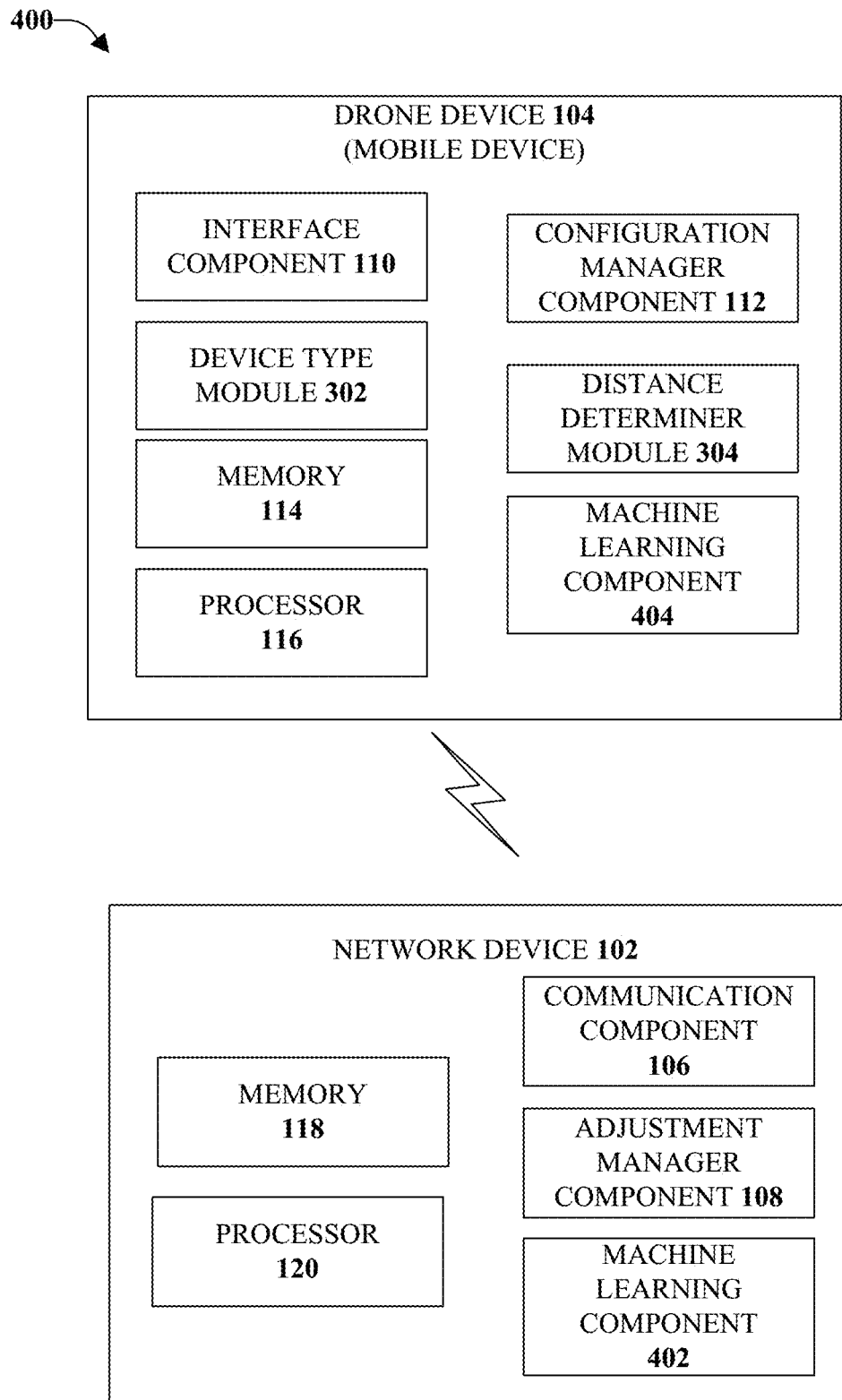
FIG. 4 illustrates a block diagram of an example, non-limiting system that facilitates altitude based management using machine learning in accordance with one or more embodiments described herein.

FIG. 4 illustrates a block diagram of an example, non-limiting system 400 that facilitates altitude based management using machine learning in accordance with one or more embodiments described herein. Repetitive description of like elements employed in other embodiments described herein is omitted for sake of brevity.

The non-limiting system 400 can comprise one or more of the components and/or functionality of the non-limiting communications system 100 and/or the non-limiting system 300, and vice versa. The non-limiting system 400 can include machine learning components. For example, the network device 102 can include a first machine learning component 402 and the drone device 104 can include a second machine learning component 404. The machine learning components 402, 404 can perform a set of machine learning computations associated with altitude-based device management.

For example, the machine learning components 402, 404 can perform a set of machine learning computations associated with the altitude determinations, the device-type determinations, the parameter adjustments, and other considerations in a wireless communications network that includes terrestrial devices and drone devices.

For example, the machine learning component 402 can determine whether one or more parameters of a drone device should be changed based on an altitude of the device. As the altitude of the device changes, the machine learning component 402 can tailor the one or more parameters to reduce or mitigate uplink interference in accordance with the various aspects provided herein.

The machine learning components 402, 404 can utilize machine learning systems that have been explicitly or implicitly trained to learn, determine or infer device properties (e.g., is it a terrestrial device, or a drone device), an amount of uplink interference caused by the drone device based on current settings and/or current altitude, and so on. It is to be appreciated that machine learning systems can be implemented in one or more of the components to generate explicitly and/or implicitly trained models that provide the recommendation parameter adjustments that are determined to reduce an amount of uplink interference caused by the drone device. The machine learning systems can learn systems, networks, etc., identify one or more drone devices, respective parameters of the drone devices, and so on in order to determine or infer one or more parameter adjustments that should be recommended to the drone device(s).

Figure 5:
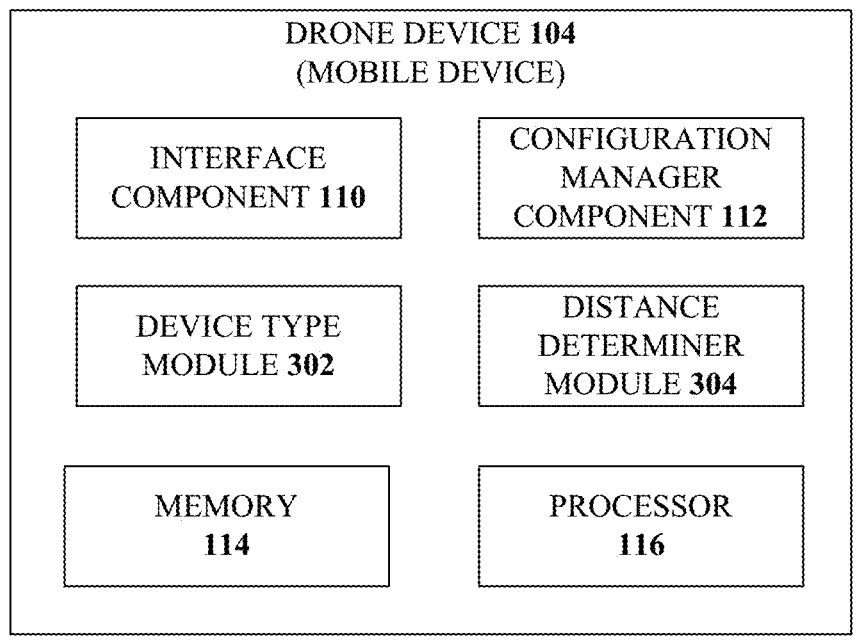
FIG. 5 illustrates a block diagram of an example, non-limiting system that facilitates parameters adjustment based on device altitude in accordance with one or more embodiments described herein.
Figure 5:
Figure 5:
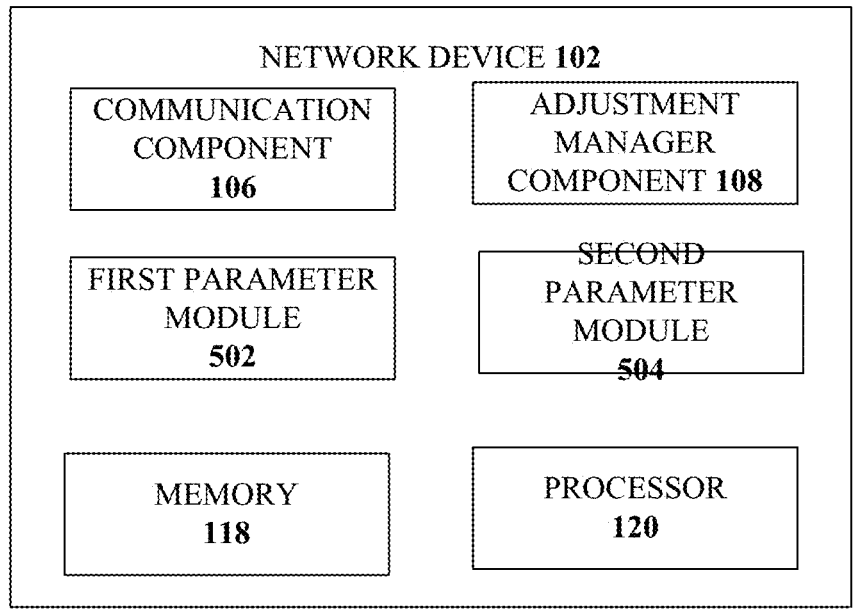

FIG. 5 illustrates a block diagram of an example, non-limiting system 500 that facilitates parameters adjustment based on device altitude in accordance with one or more embodiments described herein. Repetitive description of like elements employed in other embodiments described herein is omitted for sake of brevity.

The non-limiting system 500 can comprise one or more of the components and/or functionality of the non-limiting communications system 100, the non-limiting system 300, the non-limiting system 400, and vice versa. As illustrated, the network device can comprise a first parameter module 502 and a second parameter module 504. The first parameter module 502 can be utilized for devices that are ground based and/or for unmanned aerial vehicles that are located near the ground. For example, the unmanned aerial vehicles located near the ground might not be in flight, might be just starting or ending flight, or might be operating at lower altitudes for other reasons. Based on the determination of whether the device is a ground-based device or an unmanned aerial vehicle near the ground (e.g., the location of the drone device 104), the first parameter module 502 can provide a first set of parameters for the one or more devices in this location category.

If the device is an unmanned aerial vehicle and its altitude is above a defined altitude, a second set of parameters can be provided to a particular unmanned aerial vehicle by the second parameter module 504. In an example, the defined altitude can be a position above antennas of a base station. In another example, there can be more than one defined altitude or altitude ranges as discussed above. In this manner, the first parameter module 502 can output parameters x and y; and the second parameter module 504 can output respective parameters x' and y' to the one or more drone devices 104.

Figure 6:
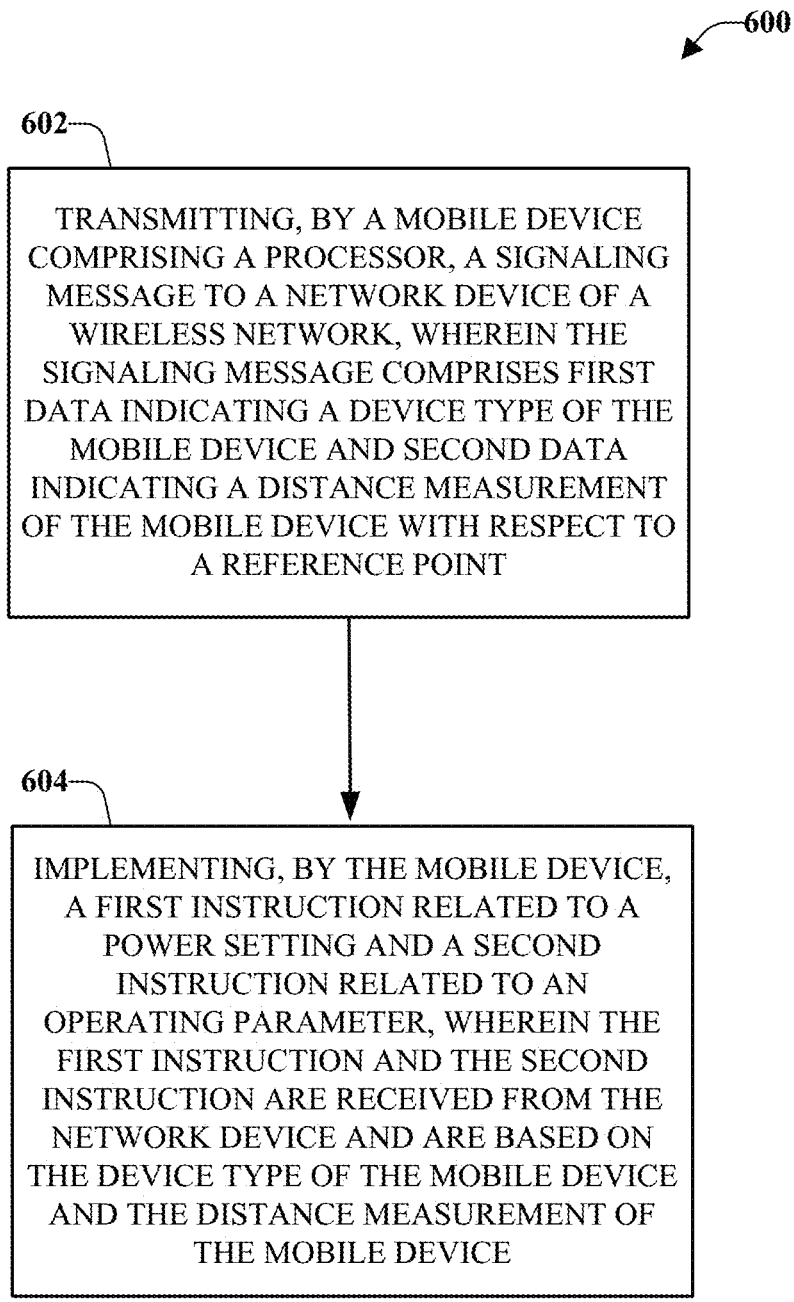
FIG. 6 illustrates an example, non-limiting method for altitude-based device management in accordance with one or more embodiments described herein.

FIG. 6 illustrates an example, non-limiting method 600 for altitude-based device management in accordance with one or more embodiments described herein. The non-limiting method 600 starts at 602 with transmitting a signaling message to a network device of a wireless network. The signaling message can comprise first data indicating a device type of a mobile device and second data indicating a distance measurement of the mobile device with respect to a reference point.

According to an implementation, the device type of the mobile device can comprise a device capable of movement in a vertical direction as compared to a terrestrial device not capable of movement in the vertical direction. Further, to this implementation, the mobile device can be an unmanned aerial vehicle equipped with wireless communications functionality.

According to an implementation, the distance measurement can be included in a defined measurement range identified by a value associated with the second data. Further, to this implementation, the defined measurement range can be configured to conserve battery resources of the mobile device. In an implementation, the reference point can be a mean sea level and the distance measurement can be an altitude measurement. In another implementation, the reference point can be a local ground level and the distance measurement can be an altitude measurement.

At 604, the method 600 includes implementing a first instruction related to a power setting and a second instruction related to an operating parameter. The first instruction and the second instruction can be received from the network device and can be based on the device type of the mobile device and the distance measurement of the mobile device.

According to some implementations, implementing the first instruction related to the power setting and the second instruction related to the operating parameter can comprise receiving the first instruction and the second instruction that are configured for the mobile device based on the signaling message.

In an example, the network device can be a first network device, and the second instruction can comprise a hand-off instruction that indicates a movement of the mobile device from the first network device to a second network device.

Figure 7:
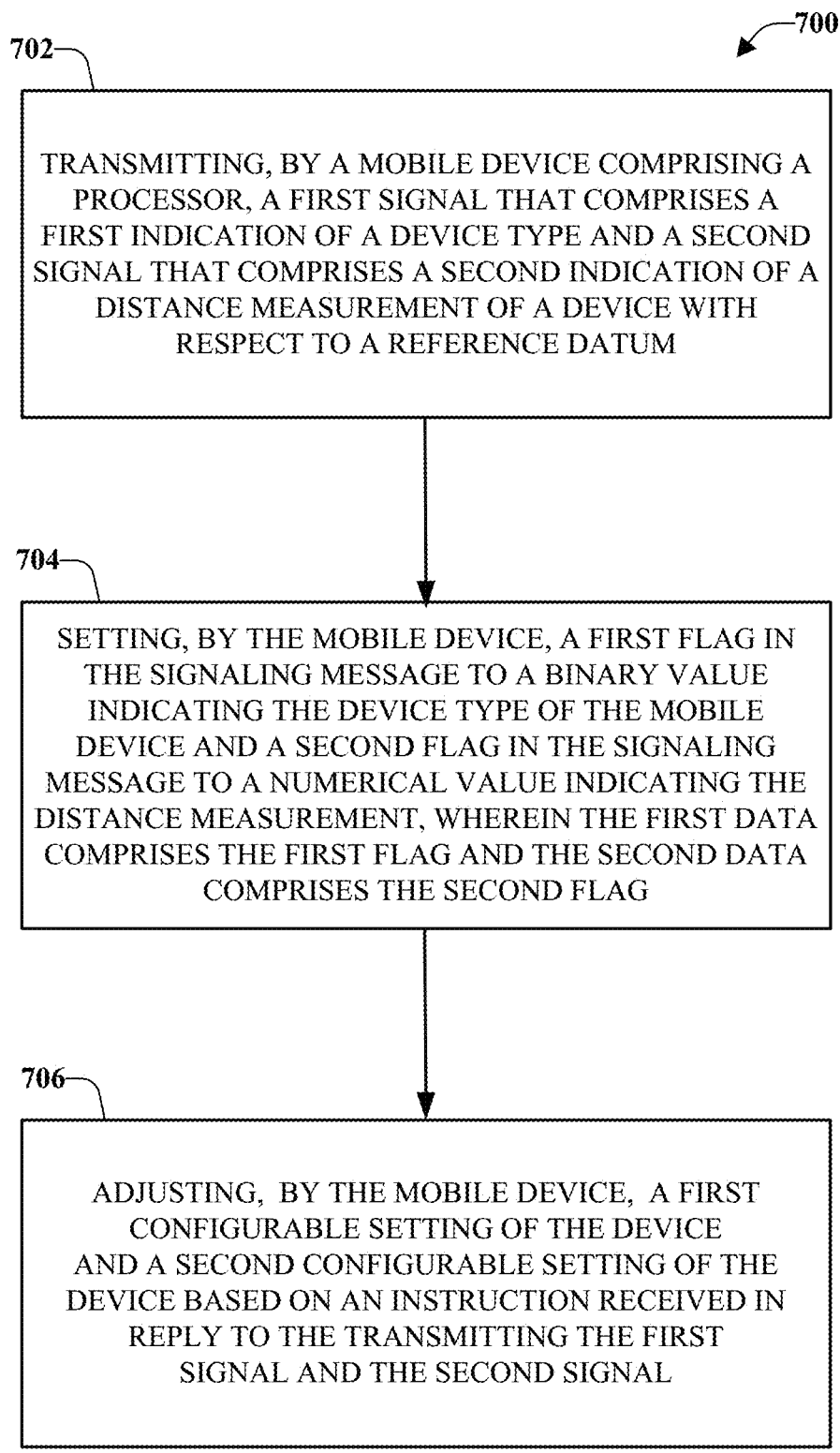
FIG. 7 illustrates an example, non-limiting method for managing uplink interference associated with a drone device in accordance with one or more embodiments described herein.

FIG. 7 illustrates an example, non-limiting method 700 for managing uplink interference associated with a drone device in accordance with one or more embodiments described herein. The non-limiting method 700 starts at 702 with transmitting a first signal that comprises a first indication of a device type and a second signal that comprises a second indication of a distance measurement of a device with respect to a reference datum. The reference datum can be a local ground level, for example.

The method 700 can also include, at 704, setting a first flag in the signaling message to a binary value indicating the device type of the mobile device and a second flag in the signaling message to a numerical value indicating the distance measurement. The first data can comprise the first flag and the second data can comprise the second flag. According to some implementations, the binary value can be a value of zero based on the mobile device being a ground-based device and a value of one based on the mobile device being a self-powered air transport device.

At 706, a first configurable setting of the device and a second configurable setting of the device are adjusted based on an instruction received in reply to the transmitting the first signal and the second signal. The change to the first configurable setting and the second configurable setting can be customized for the device based on the device type and the distance measurement. According to an implementation, the first configurable setting can be related to an operating parameter and the second configurable setting can be related to a power parameter.

Another message can be sent to update parameters associated with the drone device. Thus, a third signal that comprises a third indication of a device type and a fourth signal that comprises a fourth indication of a distance measurement of a device with respect to a reference datum can be transmitted. The third indication can be the same as the first indication. However, the position of the device might have changed and, therefore, the second indication and the fourth indication can be different. If the indications are different, further instructions can be provided related to mitigating or reducing uplink interference in a wireless communications network.

According to the various aspects provided herein, the drone can identify itself to the network with its approximate altitude (e.g., via a signaling message). Uplink power control algorithm and parameters can be defined to better control uplink UAS and IoTs. Further, handover optimization parameters can be provided for high altitude devices.

Figure 8:
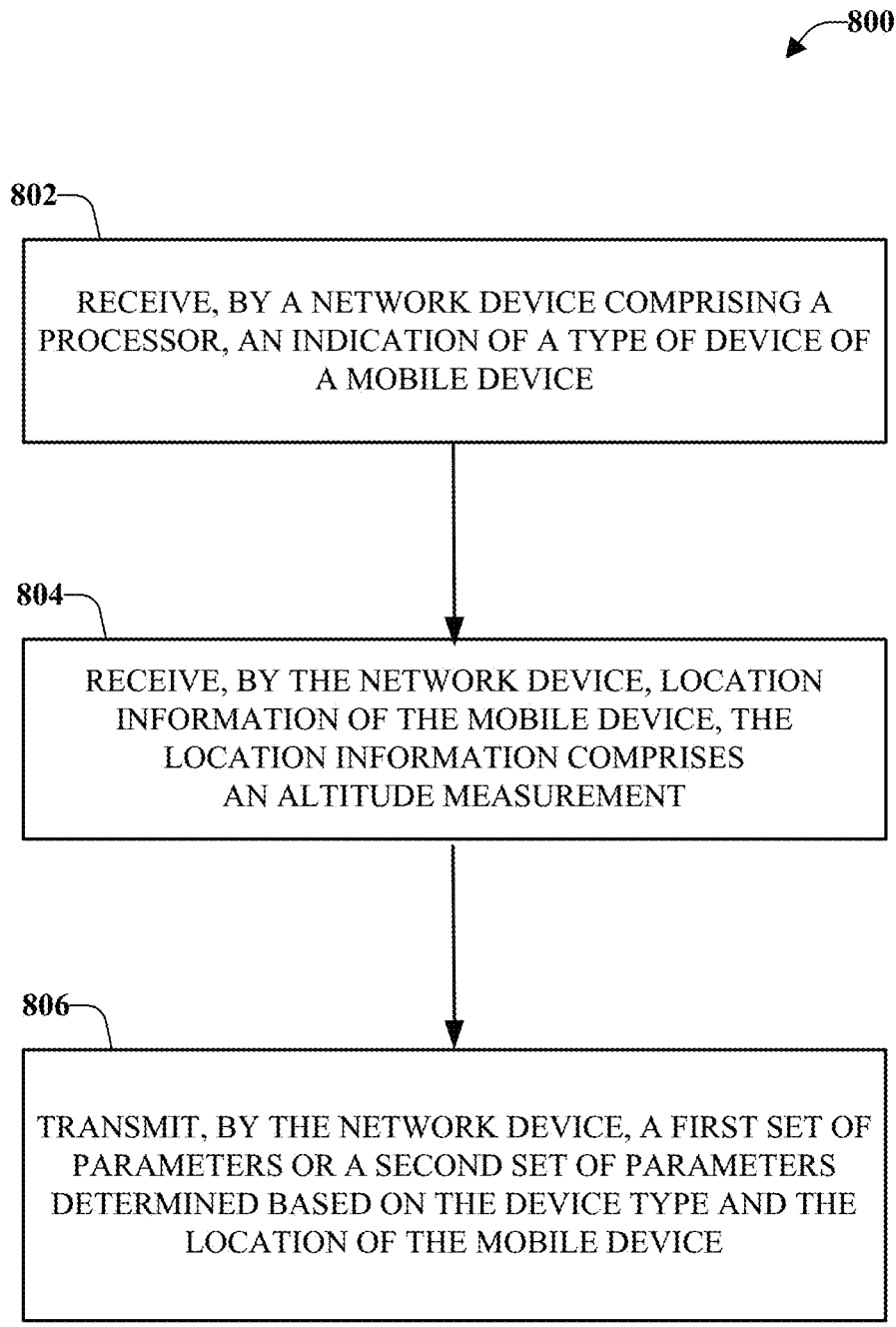
FIG. 8 illustrates an example, non-limiting method for tailoring parameters for an unmanned aerial vehicle in accordance with one or more embodiments described herein.

FIG. 8 illustrates an example, non-limiting method 800 for tailoring parameters for an unmanned aerial vehicle in accordance with one or more embodiments described herein. The non-limiting method 800 starts at 802, when a device type of a mobile device is received at a network device. The device type can be received in a signaling message from the mobile device. Further, the type can indicate whether the mobile device is a ground-based device or whether the device is an unmanned aerial vehicle.

Further, at 804, location information of the mobile device can be received. The location information can be provided in the signaling message and can include an altitude measurement. According to some implementations, the location can include an indication of a latitude and longitude location of the mobile device. In some implementations, the altitude measurement can indicate a range of measurements instead of a specific altitude.

Based on the received information, at 806 a set of parameters can be transmitted based on the device type and the location of the mobile device. For example, if the device type is a ground-based device, a first set of parameters (e.g., x and y parameters) can be provided to the device. If the device type is an unmanned aerial vehicle and the device location is below a defined altitude, the first set of parameters can be transmitted to the device. However, if the device type is an unmanned aerial vehicle and the location is above the defined altitude, a second set of parameters (e.g., x' and y' parameters) can be transmitted to the device. The second set of parameters can be tailored for the device based on the altitude being included in a range of altitudes, or based on a more accurate altitude measurement.

Described herein are systems, methods, articles of manufacture, and other embodiments or implementations that can facilitate altitude based device management in a 5G network. Facilitating altitude based device management for a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., sub-carrier spacing). If the carriers use the same bandwidth spacing, then it can be considered a single numerology. However, if the carriers occupy different bandwidth and/or spacing, then it can be considered a multiple numerology.

Figure 9:
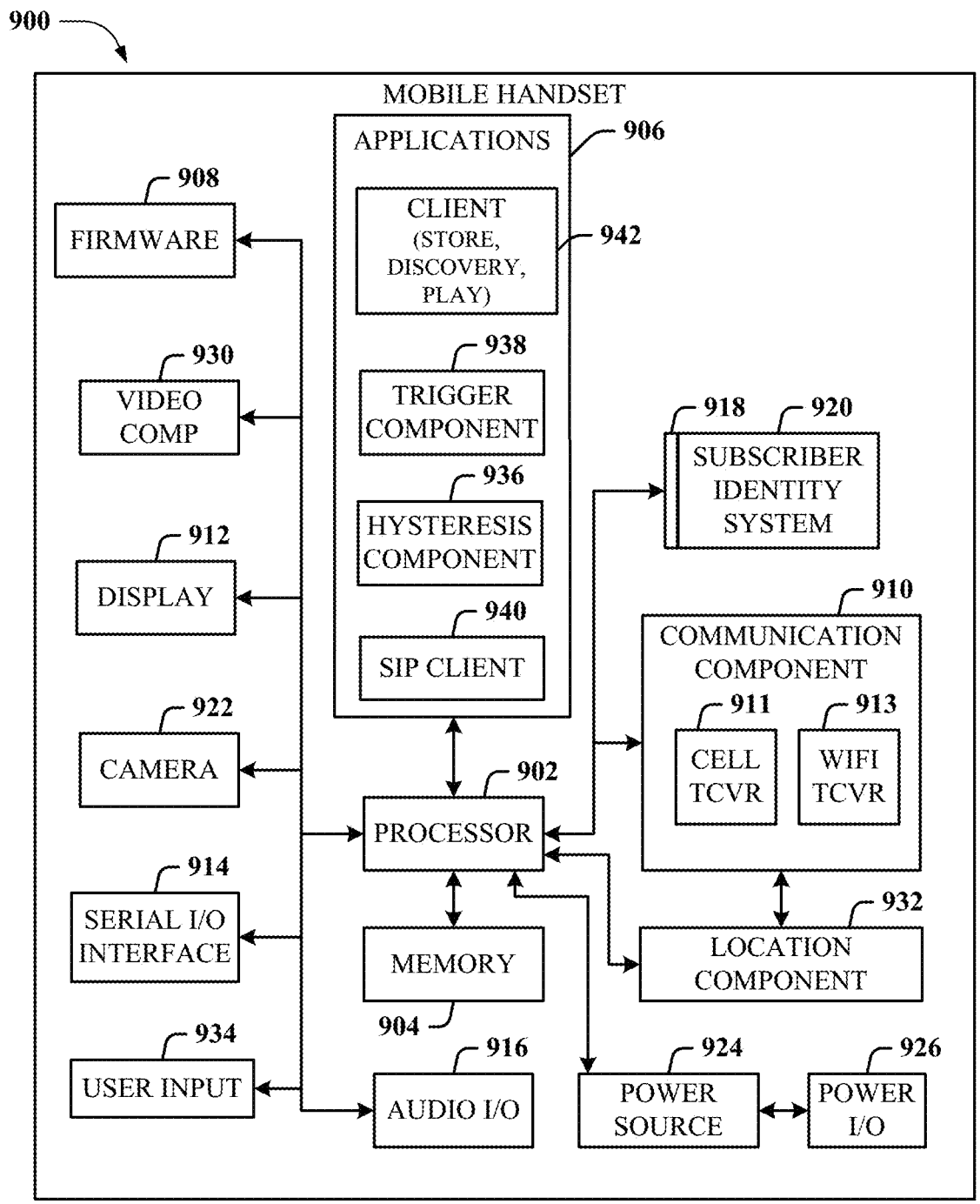
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
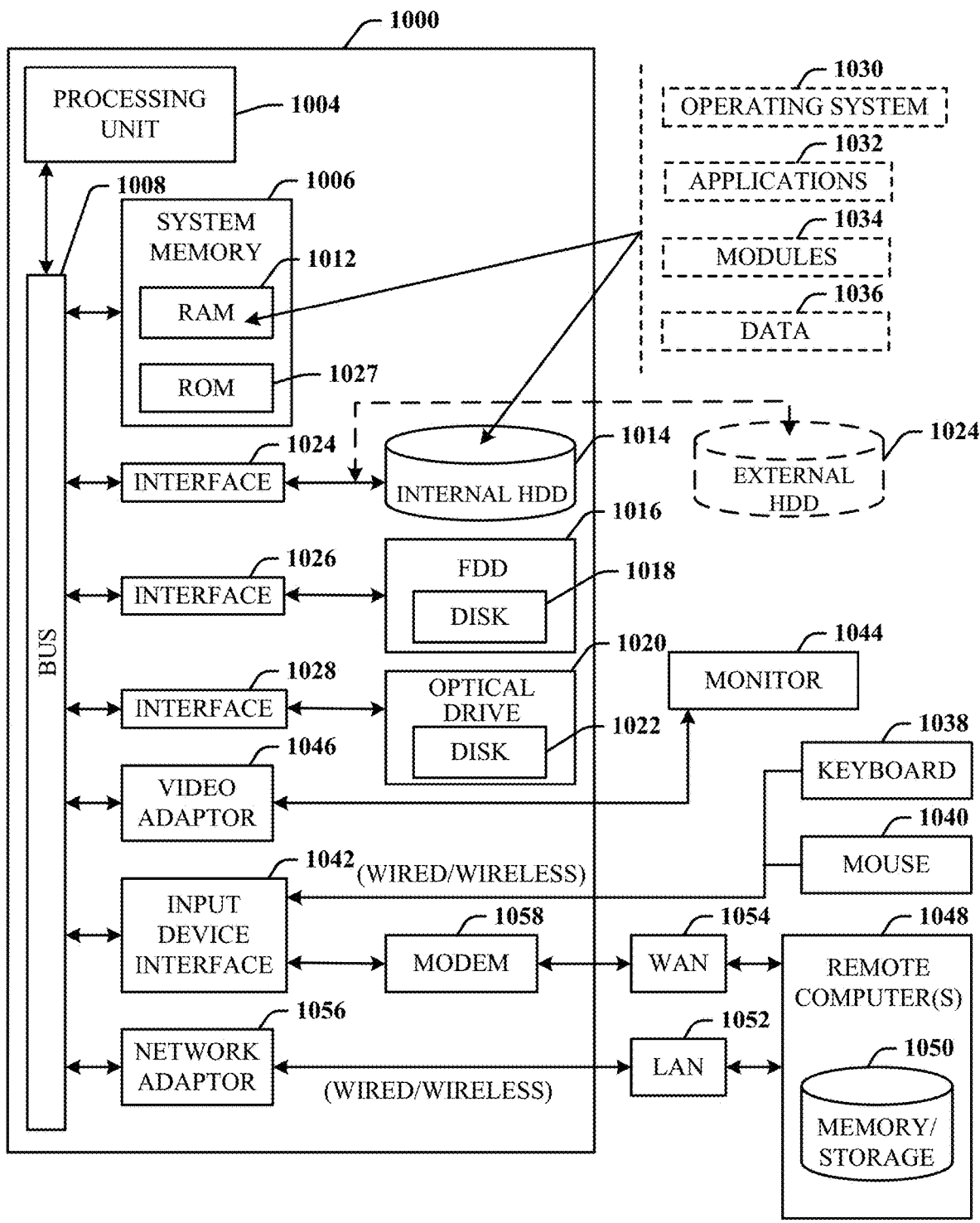
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

The communication link-system performance can be enhanced with the use of forward error correction codes. When forward error correction is applied to the information block the additional parity bits can be added to the information bits. These additional parity bits can protect the information bits when passed through the communication channel from effects of the channel (e.g., Additive White Gaussian Noise (AWGN), multipath fading and so on). Currently, 3GPP is discussing forward error correction codes for data traffic channels and control channels, which have short block lengths for 5G systems. Examples of these include turbo convolution codes, low density parity check (LDPC) codes, and polar code.

For turbo convolution codes, two convolution codes can be concatenated in parallel and iterative decoding can be applied at the receiver. The convolution codes can perform close to Shannon limit in AWGN channels. The Shannon limit, or Shannon capacity, of a communications channel refers to a theoretical maximum information transfer rate of the channel for a particular noise level. Currently 3G and 4G systems are using these type of codes. LDPC codes, also referred to as Gallager codes, are a class of linear block codes where the parity check matrix is sparse (low density of 1 s). When iterative decoding is applied at the receiver, these codes can perform close to Shannon capacity with less decoding complexity. Currently IEEE 802.11x, family uses LDPC codes as forward error correction code. Further, polar codes can achieve the symmetric capacity of arbitrary binary-input discrete memoryless channels under a low complexity successive cancellation decoding strategy. Based on performance in additive AWGN channels, LDPC code can be used for data traffic channels and polar codes can be used for control channels.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments, In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    facilitating, by network equipment comprising a processor, receiving a first value indicative of a classification type of a user equipment and a second value indicative of a vertical distance measurement of the user equipment;
    comparing, by the network equipment, the vertical distance measurement to a defined vertical distance value; and
    based on the vertical distance measurement being determined to be within a defined measurement range, based on the classification type, and based on the vertical distance measurement being determined to satisfy a function of the defined vertical distance value as a result of the comparing, facilitating, by the network equipment, to the user equipment, transmitting a parameter selected from a group of parameters, wherein the parameter comprises instructions related to adjustment of a setting of the user equipment.

2. The method of claim 1, further comprising:
    prior to facilitating the transmitting, customizing, by the network equipment, the parameter for the user equipment based on the first value and the second value.

3. The method of claim 2, wherein the customizing comprises facilitating transmitting instructions to the user equipment, and wherein the instructions are related to the setting of the user equipment.

4. The method of claim 1, wherein the receiving comprises receiving, from the user equipment, a signaling message that comprises a first flag and a second flag, wherein the first flag is set to represent the first value, and wherein the second flag is set to represent the second value.

5. The method of claim 1, wherein the parameter is related to a handover instruction that indicates a movement of communication of the user equipment between the network equipment, wherein the function of the defined vertical distance value comprises the function of a defined altitude value, and wherein the parameter is selected based on the vertical distance measurement satisfying the function of the defined altitude value.

6. The method of claim 1, wherein the parameter is a first parameter, and wherein the method further comprises:
    based on the vertical distance measurement failing to satisfy the function of the defined vertical distance value, selecting, by the network equipment, a second parameter from the group of parameters, wherein the first parameter and the second parameter are different parameters.

7. The method of claim 1, wherein the second value is set based on a determination that the vertical distance measurement is within the defined measurement range.

8. The method of claim 1, wherein the classification type comprises an indication that the user equipment is capable of self-powered flight.

9. The method of claim 1, wherein the classification type comprises an indication that the user equipment is an unmanned aerial vehicle.

10. The method of claim 1, wherein the classification type indicates the user equipment is classified as a drone-type device.

11. A system, comprising:
    a processor; and
    a memory that stores executable instructions that, when executed by the processor, facilitate performance of operations, comprising:
        selecting a parameter from a group of parameters based on a message received from a user equipment, resulting in a selected parameter, wherein the message comprises a first value indicative of a classification type of the user equipment and a second value indicative of a vertical distance measurement of the user equipment, and wherein the selecting comprises:

comparing the vertical distance measurement to a defined vertical distance value, and based on a result of the comparing indicating that the vertical distance measurement satisfies a condition with respect to the defined vertical distance value, selecting a first parameter from the group of parameters; and sending, to the user equipment, information associated with the selected parameter, wherein the information comprises a setting adjustment instruction for the user equipment.

12. The system of claim 11, wherein the operations further comprise:

prior to the selecting, receiving, from the user equipment, a transmission of the message that comprises a first flag set to the first value and a second flag set to the second value.

13. The system of claim 11, wherein the operations further comprise:

based on the result of the comparing indicating that the vertical distance measurement fails to satisfy the condition with respect to the defined vertical distance value, selecting a second parameter from the group of parameters, wherein the first parameter and the second parameter are different parameters.

14. The system of claim 11, wherein the classification type is a type indicating that the user equipment is capable of self-powered flight.

15. The system of claim 11, wherein the classification type is a type indicating that the user equipment is an unmanned aerial vehicle.

16. The system of claim 11, wherein the classification type a type indicating the user equipment is a drone.

17. A non-transitory machine-readable medium, comprising executable instructions that, when executed by a processor, facilitate performance of operations, comprising:

determining a group of parameters for a user equipment based on a message received from the user equipment, wherein the message comprises a first value that indicates a type of the user equipment and a second value that indicates a vertical distance measurement of the user equipment with respect to sea level;

comparing the vertical distance measurement to a defined altitude resulting in a comparison output; and based on the comparison output indicating that the vertical distance measurement satisfies a condition of the defined altitude, selecting first parameters of the group of parameters, and sending first parameter information indicative of the first parameters to the user equipment, wherein the first parameters are usable in respective instructions for adjustment of respective settings of the user equipment.

18. The non-transitory machine-readable medium of claim 17, wherein the operations further comprise:

prior to the determining, receiving, from the user equipment, a signaling message that comprises a first flag and a second flag, wherein the first flag is set to the first value, and wherein the second flag is set to the second value.

19. The non-transitory machine-readable medium of claim 18, wherein the second flag is set based on a determination that the vertical distance measurement is within a defined range of distances.

20. The non-transitory machine-readable medium of claim 18, wherein the operations further comprise:

based on a comparison output indicating that the vertical distance measurement does not satisfy the condition of the defined altitude:

selecting second parameters of the group of parameters, and sending second parameter information indicative of the second parameters to the user equipment, wherein the first parameters and the second parameters are different parameters.

* * * * *